(12) United States Patent
Peringassery Krishnan et al.

(10) Patent No.: US 12,425,596 B2
(45) Date of Patent: Sep. 23, 2025

(54) SYSTEMS AND METHODS FOR DEPENDENT QUANTIZATION BASED ON CURRENT DEQUANTIZATION STATES

(71) Applicant: Tencent America LLC, Palo Alto, CA (US)

(72) Inventors: Madhu Peringassery Krishnan, Palo Alto, CA (US); Lien-Fei Chen, Palo Alto, CA (US); Biao Wang, Palo Alto, CA (US); Xin Zhao, Palo Alto, CA (US); Roman Chernyak, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/648,129

(22) Filed: Apr. 26, 2024

(65) Prior Publication Data

US 2024/0373012 A1    Nov. 7, 2024

Related U.S. Application Data

(60) Provisional application No. 63/463,815, filed on May 3, 2023.

(51) Int. Cl.
*H04N 19/00* (2014.01)
*H04N 19/124* (2014.01)
*H04N 19/18* (2014.01)
*H04N 19/44* (2014.01)

(52) U.S. Cl.
CPC ........... *H04N 19/124* (2014.11); *H04N 19/18* (2014.11); *H04N 19/44* (2014.11)

(58) Field of Classification Search
None
See application file for complete search history.

(56) References Cited

U.S. PATENT DOCUMENTS

| | | | |
|---|---|---|---|
| 2014/0307781 A1* | 10/2014 | He | H04N 19/463 375/240.03 |
| 2016/0100168 A1* | 4/2016 | Rapaka | H04N 19/44 375/240.03 |

(Continued)

OTHER PUBLICATIONS

Tencent America LLC, ISR/WO, PCT/US2024/027082, Aug. 22, 2024, 13 pgs.

(Continued)

*Primary Examiner* — Zhihan Zhou
(74) *Attorney, Agent, or Firm* — Morgan, Lewis & Bockius LLP

(57) ABSTRACT

An example method of video coding includes receiving a video bitstream that includes a plurality of blocks and a plurality of quantized transform coefficients. The method includes deriving a dequantized transform coefficient for a first quantized transform coefficient of the plurality of quantized transform coefficients. The method also includes obtaining an adjusted transform value by applying an offset value to the dequantized transform coefficient, the adjusted transform value based on a quantized transform coefficient level and a current state of dequantization. The method further includes reconstructing a first block using the adjusted transform value.

20 Claims, 8 Drawing Sheets

(56) References Cited

U.S. PATENT DOCUMENTS

2021/0084304 A1* 3/2021 Schwarz .............. H04N 19/176
2021/0385453 A1* 12/2021 Sadafale .............. H04N 19/159

OTHER PUBLICATIONS

Heiko Schwarz et al., "Additional Support of Dependent Quantization with 8 States", Document: JVET-Q0243-v2, Joint Video Experts Team (JVET) of ITU-T SG 16 WP 3 and ISO/IEC JTC 1/SC 29/WG 11, 17$^{th}$ Meeting: Brussels, BE, Jan. 7-17, 2020, 12 pgs.

Muhammed Coban et al., Algorithm Description of Enhanced Compression Model 8 (ECM 8), Document: JVET-AC2025, Joint Video Experts Team (JVET) of ITU-T SG 16 WP 3 and ISO/IEC JTC 1/SC 29, 29$^{th}$ Meeting, by Teleconference, Jan. 11-20, 2023, 77 pgs.

Muhammet Balcilar et al., "AHG12 Shifting Quantizer Center", Document: JVET-AD0251-v2, Joint Video Experts Team (JVET) of ITU-T SG 16 WP 3 and ISO/IEC JTC 1/SC 29, 30$^{th}$ Meeting: Antalya, TR, Apr. 21-28, 2023, 3 pgs.

Muhammet Balcilar et al., "Vector Quantization and Shifting: Exploiting Latent Properties to Optimize Neural Codecs", The 11$^{th}$ International Conference on Learning Representations, Feb. 2023, 21 pgs.

* cited by examiner

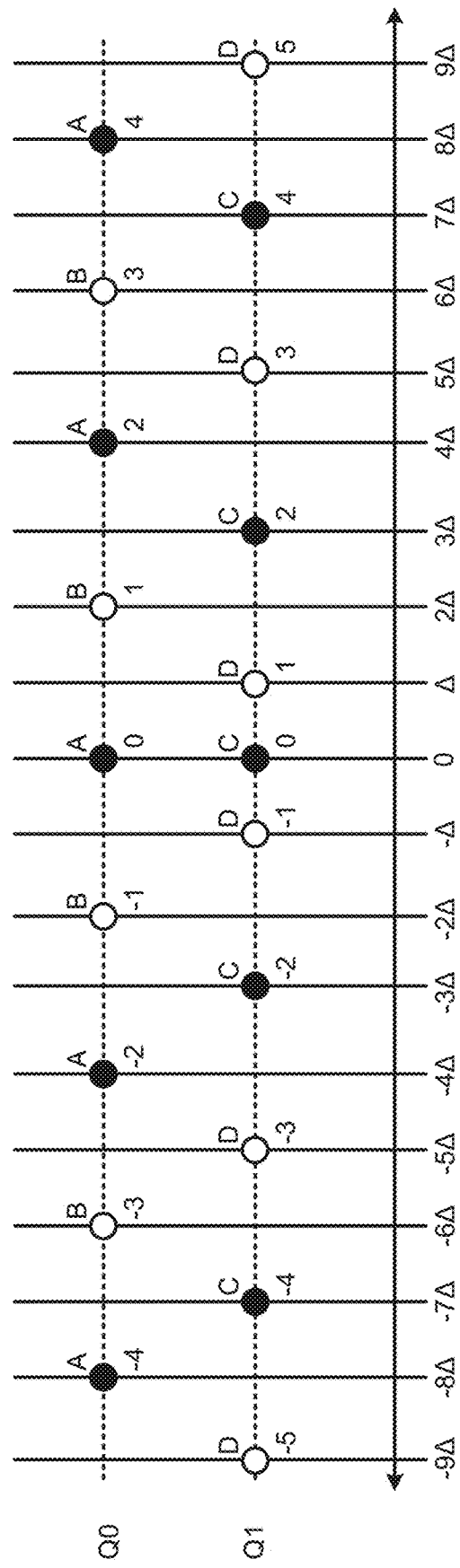
FIG. 4A
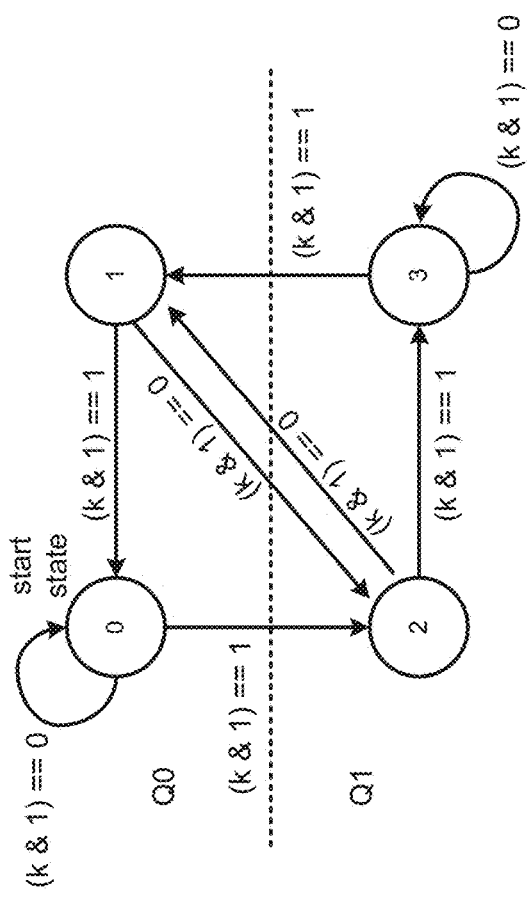
FIG. 4C
FIG. 4B

| current state | next state for ... | |
| --- | --- | --- |
| | (k & 1) == 0 | (k & 1) == 1 |
| 0 | 0 | 2 |
| 1 | 2 | 0 |
| 2 | 1 | 3 |
| 3 | 3 | 1 |
| 4 | 4 | 6 |
| 5 | 9 | 11 |
| 6 | 5 | 7 |
| 7 | 10 | 8 |
| 8 | 6 | 4 |
| 9 | 8 | 10 |
| 10 | 7 | 5 |
| 11 | 11 | 9 |

FIG. 4D

SYSTEMS AND METHODS FOR DEPENDENT QUANTIZATION BASED ON CURRENT DEQUANTIZATION STATES

RELATED APPLICATIONS

This application claims priority to U.S. Provisional Patent Application No. 63/463,815, entitled "Dependent Quantizer with Shifted Quantization Center" filed May 3, 2023, which is hereby incorporated by reference in its entirety.

TECHNICAL FIELD

The disclosed embodiments relate generally to video coding, including but not limited to systems and methods for dependent scalar quantization.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes, amongst other things, dependent scalar quantization. Dependent scalar quantization is a technique in which a set of reconstruction values for transform coefficients depend on the values of the transform coefficient levels that precede the current transform coefficient level in the reconstruction order. Because quantization indices should be integers, an original reconstructed coefficient may be calculated, and a shifted reconstructed coefficient may be calculated by shifting the quantization indices in the opposite direction of zero. Then a weighted sum may be calculated as the reconstructed coefficient. However, when multiple quantizers are used, for some states, simply shifting the index of the current quantizer may be less accurate than using a result of another quantizer. The present disclosure describes using the state information to obtain a more accurate shifted value, thereby improving decoded video quality due to more accurate/precise dequantized transform coefficients.

In accordance with some embodiments, a method of video decoding includes: (i) receiving a video bitstream comprising a plurality of blocks and a plurality of quantized transform coefficients; (ii) deriving a dequantized transform coefficient for a first quantized transform coefficient of the plurality of quantized transform coefficients; (iii) obtaining an adjusted transform value by applying an offset value to the dequantized transform coefficient, the adjusted transform value based on a quantized transform coefficient level and a current state of dequantization; and (iv) reconstructing a first block using the adjusted transform value.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder). In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 4A illustrates example scalar quantizers in accordance with some embodiments.

FIGS. 4B-4D illustrate example state transitions for quantizers in accordance with some embodiments.

In accordance with common practice, the various features illustrated in the drawings are not necessarily drawn to scale, and like reference numerals can be used to denote like features throughout the specification and figures.

DETAILED DESCRIPTION

The present disclosure describes video/image compression techniques including using scalar quantizers to reconstruct transform coefficients. The scalar quantizers may implement the technique of dependent scalar quantization in which a set of admissible reconstruction values for a transform coefficient depends on the values of the transform coefficient levels that precede the current transform coefficient level in reconstruction order. To reduce quantization error, a weighted sum may be calculated between the current state and a shifted state (e.g., shifted away from zero to account for the quantization error) to derive the reconstructed transform coefficient. However, simply selecting a shifted state for the quantizer may result in a less accurate/precise reconstructed transform coefficient than selecting a closest adjacent state (away from zero) for the current state. By using the current state information, a closest adjacent state may be identified and used. An advantage of using the current state information of a dependent quantizer to shift the reconstructed transform coefficient values is improved decoded video quality due to more accurate/precise dequantized transform coefficients.

Example Systems and Devices

Figure 1:
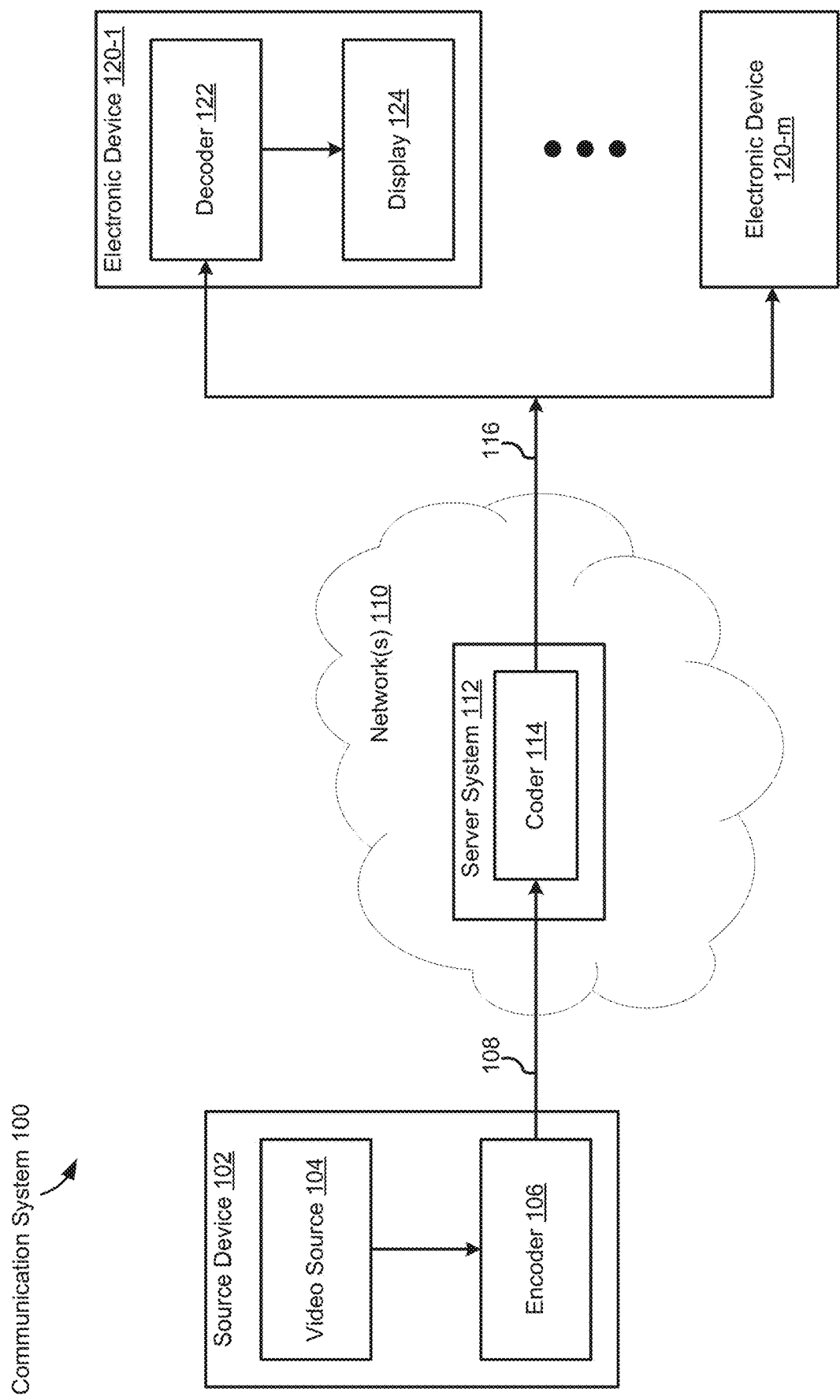
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-$m$) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 docs not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
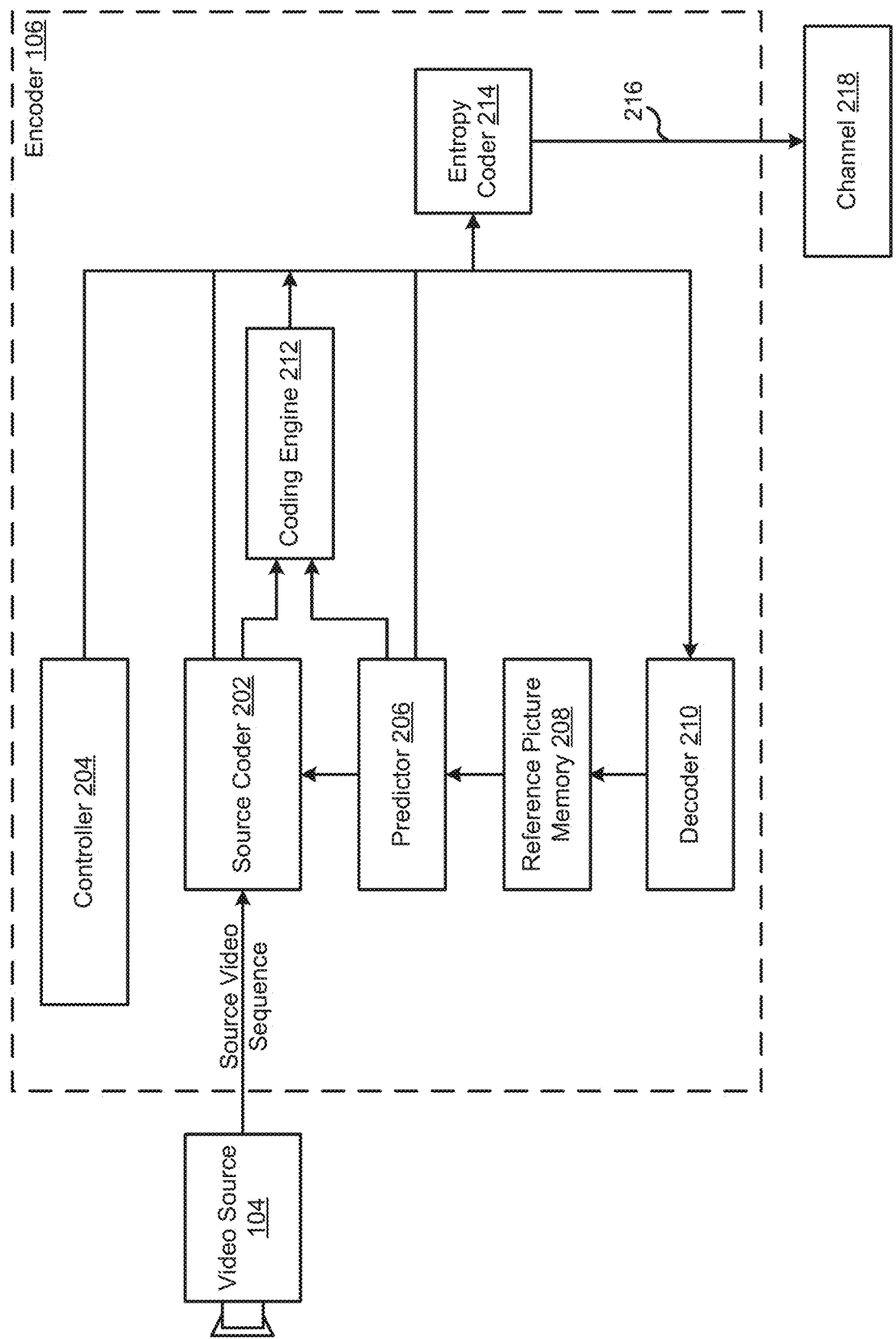
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
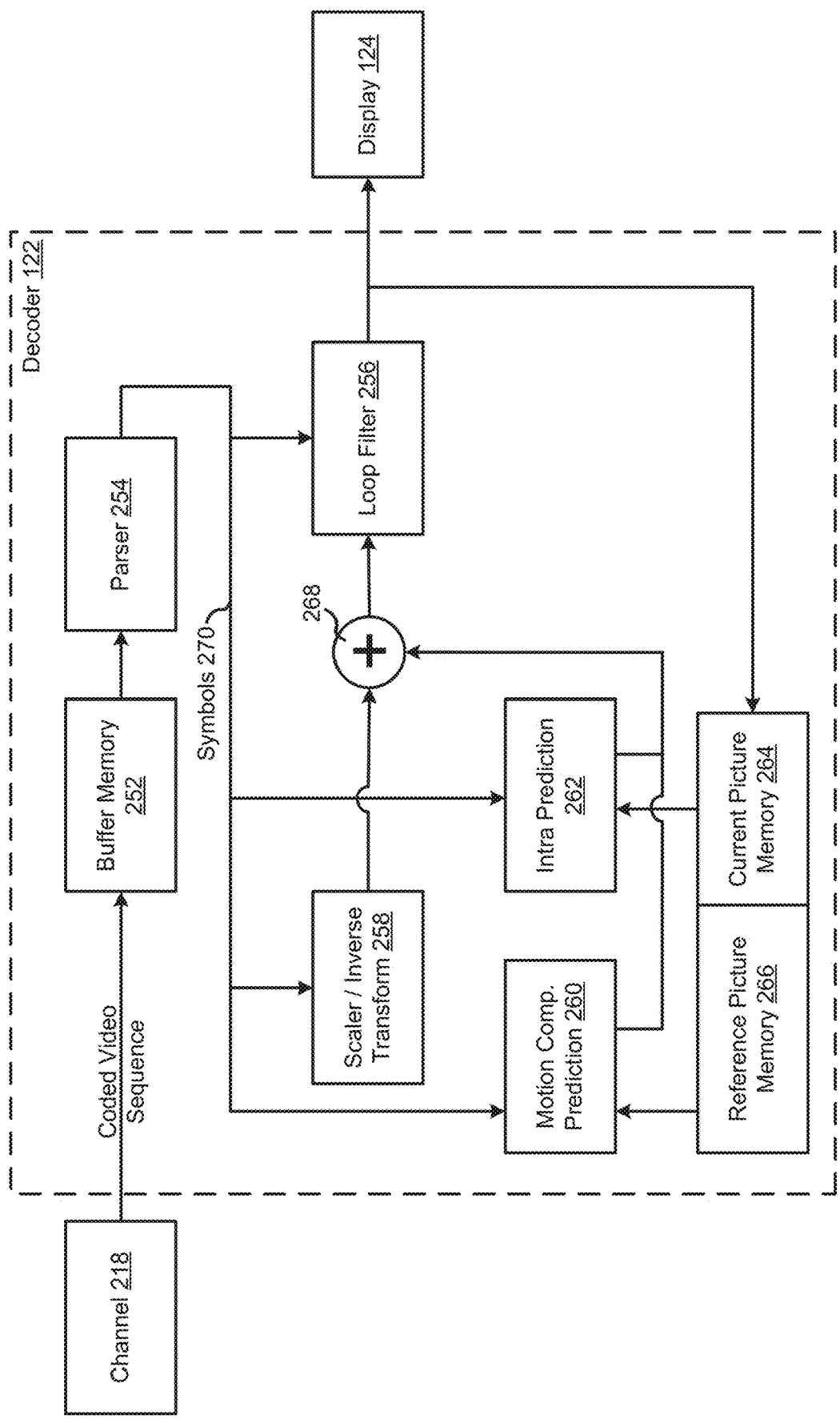
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when subsample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
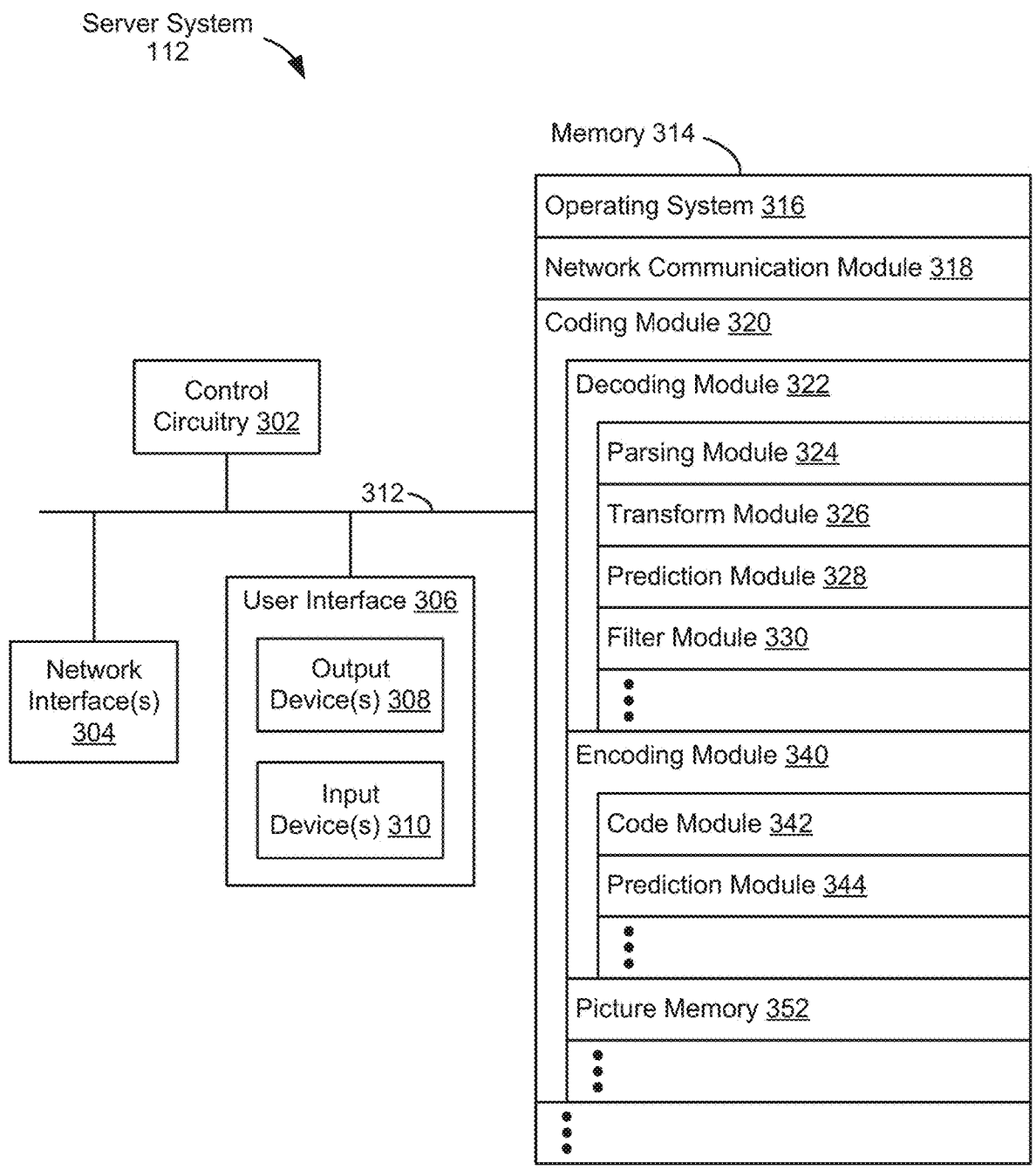
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:
- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). In the following, the terms "transform coefficient level" and "quantization index" refer to the magnitude of signaled (or parsed) transform coefficient values after quantization (and before dequantization).

As mentioned previously, the present disclosure describes improvements to dependent scalar quantization. In comparison to conventional independent scalar quantization (e.g., as used in HEVC), the admissible reconstruction vectors for dependent scalar quantization may be packed denser in the N-dimensional vector space, where N represents the number of transform coefficients in a transform block. In this way, for a given average number of admissible reconstruction vectors per N-dimensional unit volume, the average distortion between an input vector and the closest reconstruction vector is reduced. The approach of dependent scalar quantization may be realized by: (a) defining two scalar quantizers with different reconstruction levels and (b) defining a process for switching between the two scalar quantizers.

FIG. 4A illustrates example scalar quantizers, denoted by Q0 and Q1, in accordance with some embodiments. As illustrated in FIG. 4A, the location of the available reconstruction levels is uniquely specified by a quantization step size $\Delta$. The scalar quantizer used (Q0 or Q1) may not be explicitly signaled in the bitstream. Instead, the quantizer used for a current transform coefficient may be determined by the parities of the transform coefficient levels that precede the current transform coefficient in coding/reconstruction order.

FIGS. 4B-4D illustrate example state transitions for quantizers in accordance with some embodiments. As illustrated in FIGS. 4B and 4C, the switching between the two scalar quantizers (Q0 and Q1) may be realized via a state machine with four states. In this example, the state may take four different values: 0, 1, 2, 3. As shown in FIG. 4B, the states 0 and 1 may correspond to Q0, and the states 2 and 3 may correspond to Q1. The state is uniquely determined by the parities of the transform coefficient levels preceding the current transform coefficient in coding/reconstruction order.

At the start of the inverse quantization for a transform block, the state may be set equal to 0. The transform coefficients may then be reconstructed in a scanning order (e.g., in the same order they are entropy decoded). In this example, after a current transform coefficient is reconstructed, the state is updated as shown in FIGS. 4B and 4C, where k denotes the value of the transform coefficient level. The state transition table may be expressed as shown in Equation 1 below.

Example State Transition Table $$QStateTransTable[\,][\,] = \{\{0, 2\}, \{2, 0\}, \{1, 3\}, \{3, 1\}\} \quad \text{Equation 1}$$

The mapping of transmitted transform coefficient levels to intermediate quantization indexes (e.g., according to a residual_coding ( ) syntax structure) may be derived as shown in Equation 2 below.

Example Transform Coefficient Level Derivation $$TransCoeffLevel[x0][y0][cIdx][xC][yC] = \quad \text{Equation 2}$$
$$(2 * AbsLevel[xC][yC] - (QState > 1 ? 1 : 0)) *$$
$$(1 - 2 * \text{coeff\_sign\_flag}[n])$$

Thus, states {0, 1} use the Q0 quantizer (with even multiplies of step size) and states {2, 3} use the Q1 quantizer (with odd multiplies of step size).

The coding efficiency of trellis-coded quantization may be increased by increasing the number of quantization states (e.g., at the cost of a higher encoder complexity). In some embodiments, the dependent quantization includes 4 quantization states (as illustrated in FIGS. 4B and 4C). In some embodiments, the dependent quantization includes 8 quantization states. FIG. 4D illustrates an example state transition table for supporting both variants of dependent quantization (4 and 8 states) in a unified framework. In FIG. 4D, the dashed line box corresponds to the 4-quantization state variant and the remainder of the table corresponds to the 8-quantization state variant.

The unified state transition table may be expressed as shown in Equation 3 below.

Example Unified Transition Table $$QStateTransTable[\,][\,] = \{\{0, 1\}, \{2, 3\}, \{1, 0\}, \{3, 2\}, \{4, 6\}, \quad \text{Equation 3}$$
$$\{9, 11\}, \{5, 7\}, \{10, 8\}, \{6, 4\}, \{8, 10\}, \{7, 5\}, \{11, 9\}\}$$

In Equation 3, the first 4 states represent the state transition table for dependent quantization with 4 states and the remaining 8 states represent the state transition table for dependent quantization with 8 states. In some embodiments, the initial state for a transform block depends on the selected variant of dependent quantization. The selection may be made using a picture level flag, such as QState in Table 1 below.

TABLE 1

| Example Quantization State Flag |
| --- |
| Descriptor |
| residual_coding( x0, y0, log2TbWidth, log2TbHeight, cIdx ) { <br> ... <br>   QState = ( pic_dep_quant_enabled_idc > 1 ? 4 : 0 ) <br> ... |

The mapping of transmitted transform coefficient levels to intermediate quantization indexes may be expressed as shown in Equation 4 below.

Example Transform Coefficient Level Derivation $$TransCoeffLevel[x0][y0][cIdx][xC][yC] = \quad \text{Equation 4}$$
$$(2 * AbsLevel[xC][yC] - (QState ? 1)) *$$
$$(1 - 2 * \text{coeff\_sign\_flag}[n])$$

In this example implementation, states {0, 2, 4, 6, 8, 10} use the Q0 quantizer (with even multiplies of step size) and states {1, 3, 5, 7, 9, 11} use the Q1 quantizer (with odd multiplies of step size).

Some embodiments include a latent-shift algorithm on the end-to-end compression. End-to-end compression models may be considered an unconstrained multiple objective optimization problem where the solution should meet Karush-Kuhn-Tucker (KKT) conditions. According to KKT conditions, the sum of gradient with respect to each objective should be zero. Since there are two objectives (e.g., rate and distortion), the gradient with respect to distortion and the gradient with respect to rate should cancel themselves out (e.g., they show opposite directions). Thus, one can be used instead of the other by simply changing direction. Accordingly, in some embodiments the transform coefficient is shifted away from zero by using the gradient of a simple rate prediction in order to decrease the quantization error.

A simple proxy of rate prediction where each of the quantization indices are independent, and rate increases by absolute value of the coefficient is shown below in Equation 5.

Example Rate Prediction Proxy $$R(y_i) \cong A|y_i| + B \quad \text{Equation 5}$$

Since gradient of rate in Equation 5 is 0 where $y_i=0$, A where $y_i>0$ and $-A$ where $y_i<0$, the applied offset may be defined as shown below in Equation 6.

Example Linear Offsets $$\begin{cases} y_i \leftarrow y_i + \rho^* & y_i > 0 \\ y_i \leftarrow y_i - \rho^* & y_i < 0, \text{ for } i = 1 \ldots n \\ y_i \leftarrow y_i & y_i = 0 \end{cases} \quad \text{Equation 6}$$

Equation 6 applies some offset to the quantization index that makes them far away from zero point. The amount of the offset $\rho^* \in R^+$ can be finetuned over a validation set and used as a universal value for all videos.

Because quantization indices should be integers, the original reconstructed coefficient is calculated by $Q^{-1}(y_i)$ and reconstructed coefficient when the quantization indices is shifted by 1 quantization index to the opposite direction to zero is calculated as $Q^{-1}(y'_i)$ where $y'_i=y_i+(y_i>0?1:-1)$. Then a weighted sum of $Q^{-1}(y_i)$ and $Q^{-1}(y'_i)$ may be used as the reconstructed coefficient as shown in Equation 7 below.

$$\hat{x} = (982 * Q^{-1}(y_i) + 42 * Q^{-1}(y'_i)) \gg 10$$

Equation 7—Example Weighted Sum for Reconstructed Coefficient

In some embodiments, the shifting on the reconstruction coefficient is performed only when the quantization index is nonzero. Thus, some embodiments use a weighted sum as described in Equation 7, where $y'_i$ is calculated by shifting $y_i$ (e.g., the signaled quantization index or level) by 1 in the opposite direction of the zero center. However, this does not take into account the current state of the dependent quantizer and thus may be suboptimal. Moreover, Equation 7 does not specify which quantizer (e.g., Q0 or Q1) to use in any given instance. The suboptimality is illustrated by the following two examples on the dependent quantizers shown in FIG. 4A with 4 states, however, a similar example could also be made for dependent quantizer with 8 states.

Figure 5A:
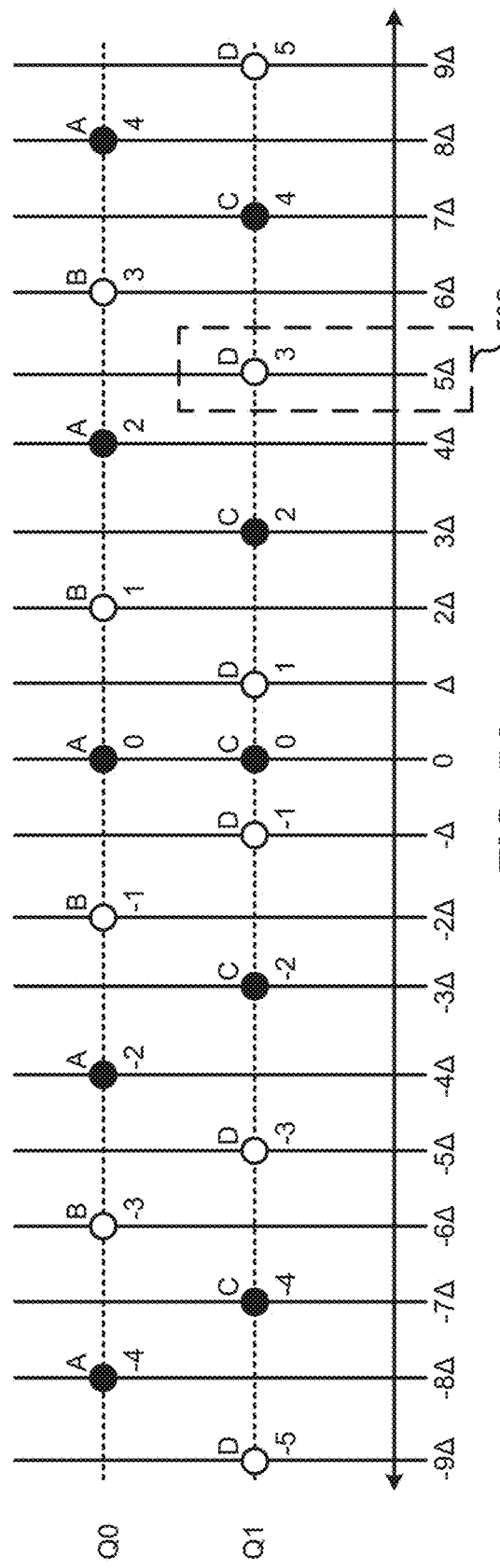
FIGS. 5A-5B illustrate example transform coefficient reconstructions using the example scalar quantizers in accordance with some embodiments.

As an example, assume the signaled transform coefficient level (or quantization index) is 3, and the decoder is currently in state {2}. According to FIGS. 4B and 4C, it can be inferred that, the decoder should use the Q1 quantizer to get a reconstructed value of 5Δ as illustrated by dashed line box 502 in FIG. 5A. In this example, the state is updated to {3} as per the table in FIG. 4B. The actual value of the transform coefficient may be within a ±Δ/2 range of 5Δ, e.g., with the +Δ/2 range having a higher probability.

If Equation 7 is used, $y_i$ corresponds to quantization index 3 and $Q^{-1}(y_i)$ corresponds to Q1(3), which results in a reconstructed value of 5Δ, as indicated by dashed line box 502. The shifted quantization index $y'_i$ (a shift-by-1 operation) corresponds to a quantization index of 4 and $Q^{-1}(y'_i)$ can be either Q1(4) or Q0(4) with reconstructed values 74 and 84 respectively. Then Equation 7 may be used to derive a final reconstructed value. Using Q1(4) or Q0(4) in Equation 7 is suboptimal because the actual value of the transform coefficient is in the ±Δ/2 range of 5Δ (with the +Δ/2 range having a higher probability). In this example, using Q0(3) with reconstruction value 6Δ would be more optimal.

Figure 5B:
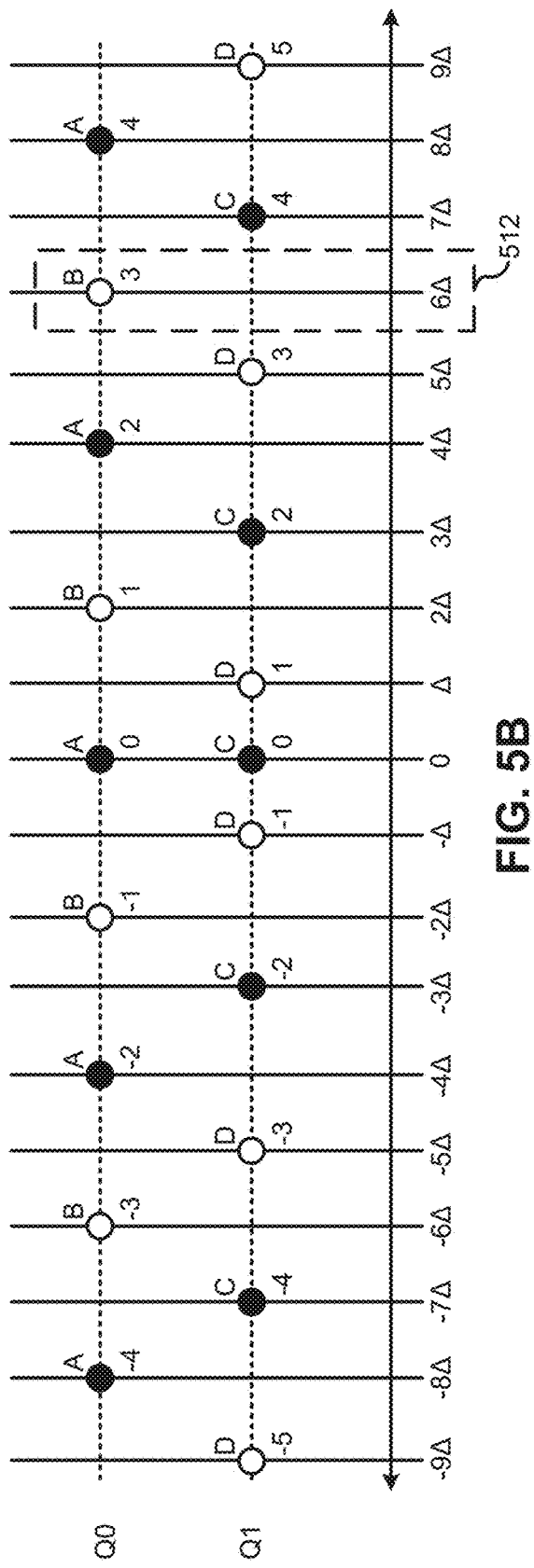

As another example, assume the signaled transform coefficient level (or quantization index) is 3, and the decoder is currently in state {1}. According to FIGS. 4B and 4C, it can be inferred that the decoder should use the Q0 quantizer to get a reconstructed value of 6Δ as illustrated by dashed line box 512 in FIG. 5B. In this example, the state is updated to {0} as per the table in FIG. 4B.

If Equation 7 is used, $y_i$ corresponds to quantization index 3 and $Q^{-1}(y_i)$ corresponds to Q0(3), which results in a reconstructed value of 6Δ. The shifted quantization index $y'_i$ corresponds to quantization index 4 and $Q^{-1}(y'_i)$ can be either Q1(4) or Q0(4) with reconstructed values 74 and 84 respectively. Then Equation 7 may be used to derive a final reconstructed value. Using Q0(4) in Equation 7 is suboptimal because the actual value of the transform coefficient is in the +Δ/2 range of 6Δ (with +Δ/2 range having a higher probability). In this example, using Q1(3) with reconstruction value 7Δ would be more optimal.

From the examples above it can be seen that for any signaled transform coefficient level (or quantization index), the quantization shifting should take into consideration the current state of the dependent quantizer to determine the optimal reconstructed value.

Figure 6:
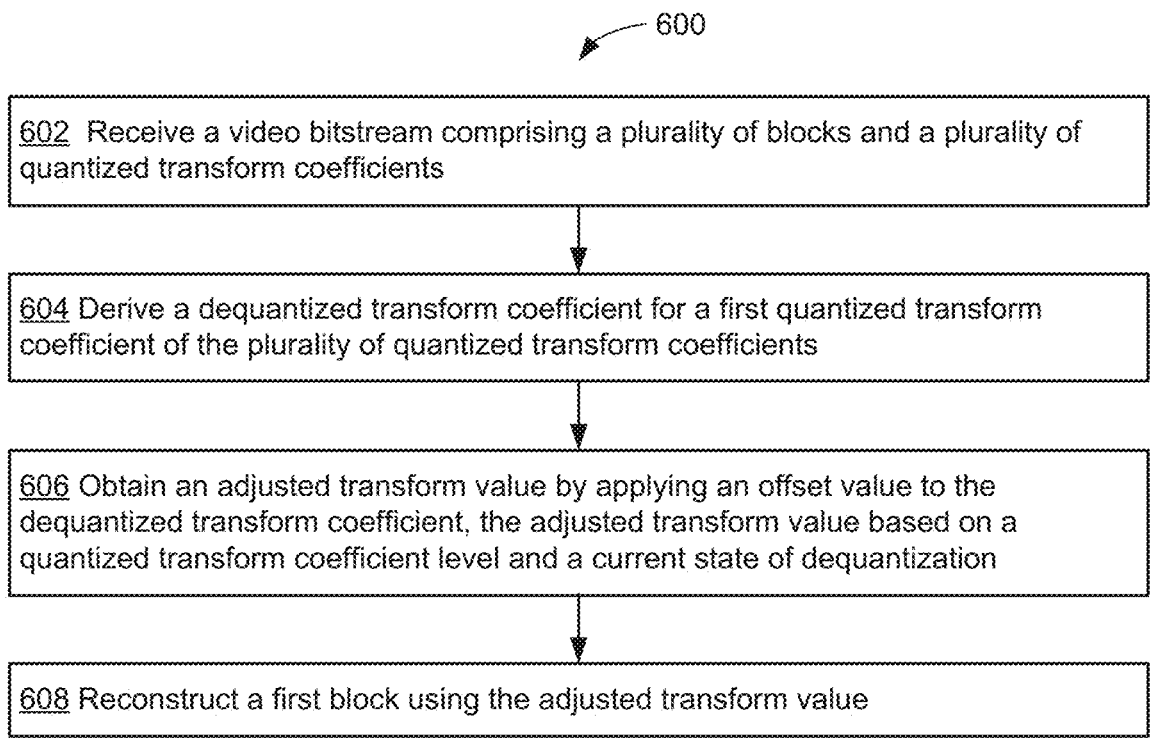
FIG. 6 illustrates an example video decoding process in accordance with some embodiments.

FIG. 6 is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream comprising a plurality of blocks and a plurality of quantized transform coefficients. The system derives (604) a dequantized transform coefficient for a first quantized transform coefficient of the plurality of quantized transform coefficients. The system obtains (606) an adjusted transform value by applying an offset value to the dequantized transform coefficient, the adjusted transform value based on a quantized transform coefficient level and a current state of dequantization. The system reconstructs (608) a first block using the adjusted transform value. For example, the current state information of the dependent quantizer may be used to shift the reconstructed transform coefficient values. In this way, the offset value applied on dequantized transform coefficient levels depends not only on the quantized transform coefficient value, but also the current state of dequantization/quantization.

In some embodiments, if the current state uses the Q1 quantizer having odd multiples of step size as reconstructed values, Equation 7 is modified as shown below in Equation 8.

Example Weighted Sum when current state uses the Q1 Quantizer $$\hat{x} = \frac{(a * Q1^{-1}(y_i) + b * Q0^{-1}(y_i))}{(a+b)} \qquad \text{Equation 8}$$

In some embodiments, the values of a and b in Equation 8 are dependent on the bit depth. In some embodiments, the sum of the values of a and b are powers of 2 and the multiplies in Equation 8 can be replaced with a right shift operation as illustrated in Equation 9 below.

Example Weighted Sum without Division Operation $$\hat{x} = (a * Q1^{-1}(y_i) + b * Q0^{-1}(y_i)) \gg \log_2(a+b) \qquad \text{Equation 9}$$

In some embodiments, if the current state uses the Q0 quantizer having even multiples of step size as reconstructed values, Equation 7 is modified as shown below in Equation 10.

Example Weighted Sum when current state uses the Q0 Quantizer $$\hat{x} = \frac{a * Q0^{-1}(y_i) + b * Q1^{-1}(y'_i)}{a+b} \qquad \text{Equation 10}$$

In some embodiments, the values of a and b in Equation 10 are dependent on the (codec operating) bit depth. In some embodiments, the sum of the values of a and b are powers of 2 and the multiplies in Equation 10 can be replaced with a right shift operation as illustrated in Equation 11 below.

Example Weighted Sum without Division Operation $$\hat{x} = (a * Q0^{-1}(y_i) + b * Q1^{-1}(y'_i)) \gg \log_2(a+b) \qquad \text{Equation 11}$$

In some embodiments, if the current state uses the Q1 quantizer, no shifting is performed on the reconstructed transform coefficient values. In some embodiments, if the current state uses the Q0 quantizer, no shifting is performed on the reconstructed transform coefficient values. In some embodiments, if the current state uses the Q1 quantizer having odd multiples of step size as reconstructed values, Equation 7 is modified according to Equation 12 below.

Example Weighted Sum when current state uses the Q1 Quantizer $$\hat{x} = \frac{a * Q1^{-1}(y_i) + b * Q0^{-1}(y_i) + c * Q1^{-1}(y'_i)}{a+b+c} \qquad \text{Equation 12}$$

In some embodiments, the values of a, b, and c in Equation 12 are dependent on a (codec operating) bit depth.

In some embodiments, if the current state uses the Q0 quantizer having even multiples of step size as reconstructed values, Equation 7 is modified according to Equation 13 below.

Example Weighted Sum when current state uses the Q0 Quantizer $$\hat{x} = \frac{a * Q0^{-1}(y_i) + b * Q1^{-1}(y'_i) + c * Q0^{-1}(y'_i)}{a+b+c} \qquad \text{Equation 13}$$

In some embodiments, the values of a, b, and c in Equation 13 are dependent on a (codec operating) bit depth. In some embodiments, the values of a, b, and/or c are signaled in a high-level syntax. In some embodiments, the value of a and/or b depends on coded information (e.g., that is known to both the encoder and decoder). In some embodiments, a subset of a, b, and c are signaled, and a different subset are derived based on coded information. In some embodiments, the value of a and/or b depends on the quantization step size granularity supported by the quantizer.

In some embodiments, the rate prediction (e.g., illustrated in Equation 5) is modeled as a quadratic equation as shown in Equation 14 below.

Example Rate Prediction Proxy $$R(y_i) \cong Ay_i^2 + B|y_i| + C \qquad \text{Equation 14}$$

In such embodiments, Equation 6 is modified according to Equation 15 below.

Example Quadratic Offsets $$\begin{cases} y_i \leftarrow y_i + \rho(|y_i|)^* & y_i > 0 \\ y_i \leftarrow y_i - \rho(|y_i|)^* & y_i < 0, \text{ for } i = 1..n \\ y_i \leftarrow y_i & y_i = 0 \end{cases} \qquad \text{Equation 15}$$

Equation 15 applies some offset to the quantization index that makes them far away from zero point. The offset however is dependent on the magnitude of the quantization index. The amount of the offset $\rho(|y_i|)^* \in R^+$ can be finetuned on a validation set and used as a universal value for all videos.

In such embodiments, Equation 7 is modified according to Equation 16 below for the Q1 quantizer.

Example Weighted Sum for Reconstructed Coefficient $$\hat{x} = \frac{a(|y_i|) * Q1^{-1}(y_i) + b(|y_i|) * Q0^{-1}(y_i)}{a(|y_i|) + b(|y_i|)} \qquad \text{Equation 16}$$

For the Q0 quantizer, Equation 7 may be modified according to Equation 17 below.

Example Weighted Sum for Reconstructed Coefficient $$\hat{x} = \frac{a(|y_i|) * Q0^{-1}(y_i) + b(|y_i|) * Q1^{-1}(y_i)}{a(|y_i|) + b(|y_i|)} \qquad \text{Equation 17}$$

In some embodiments, the value of a and/or b depends on the magnitude of the quantization index. In some embodiments, for quantization index falling in different ranges, different values for a and/or b are selected. In some embodiments, a look up table is used to make the selection for a and/or b.

Although FIG. 6 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments:

(A1) In one aspect, some embodiments include a method (e.g., the method 600) of video decoding. In some embodiments, the method is performed at a computing system having memory and one or more processors. The method includes: (i) receiving a video bitstream (e.g., a coded video sequence) comprising a plurality of blocks and a plurality of quantized transform coefficients; (ii) deriving a dequantized transform coefficient for the first quantized transform coefficient; (iii) obtaining an adjusted transform value by applying an offset value to the dequantized transform coefficient, the adjusted transform value based on a quantized transform coefficient level and a current state of dequantization; and (iv) reconstructing a first block using the adjusted transform value. For example, current state information of a dependent quantizer is used to shift the reconstructed transform coefficient values. Thus, the offset value applied on dequantized transform coefficient levels depends not only on the quantized transform coefficient value, but also the current state of the dequantization.

(A2) In some embodiments of A1, when the current state of dequantization corresponds to a first quantizer, the adjusted transform value is derived using a weighted sum operation for two states of the first quantizer. For example, if the current state uses a Q1 quantizer having odd multiples of step size as reconstructed values, then the adjusted transform value may be derived using Equation 8 above. In some embodiments, the adjusted transform value is derived using the weighted sum operation for two states of the first quantizer in accordance with a determination that the current state of dequantization corresponds to the first quantizer.

(A3) In some embodiments of A2, one or more weights for the weighted sum are based on a bit depth for the video bitstream. For example, the values of a and b in Equation 8 may be dependent on the bit depth.

(A4) In some embodiments of A2 or A3, one or more weights for the weighted sum are signaled via high-level syntax in the video bitstream. For example, the values of a and b (and optionally c) in Equations 8-13 and 16 can be signaled in one or more high-level syntaxes.

(A5) In some embodiments of any of A2-A4, one or more weights for the weighted sum are derived according to coded information. For example, the value of a and b (and optionally c) may depend on coded information that is known to both an encoder component and a decoder component.

(A6) In some embodiments of A5, the coded information includes a quantization step size granularity. For example, the value of a and b (and optionally c) may depend on the quantization step size granularity supported by the quantizer.

(A7) In some embodiments of any of A2-A6, the weighted sum operation does not include a division operation. For example, the sum of the values of a and b may be powers of 2 and the weighted sum operation may correspond to Equation 9 above. For example, all division operations may be replaced with right shift operations.

(A8) In some embodiments of any of A2-A7, when the current state of dequantization corresponds to a second quantizer, the adjusted transform value is derived using a second weighted sum operation with respective states from the first quantizer and the second quantizer. For example, if the current state uses a Q0 quantizer having even multiples of step size, then the adjusted transform value may be derived using Equation 10 above. In some embodiments, the values of a and b in Equation 10 are dependent on the bit depth. In some embodiments, the sum of the values of a and b are powers of 2 and the weighted sum operation corresponds to Equation 11 above. For example, all division operations may be replaced with right shift operations. In some embodiments, the adjusted transform value is derived using the second weighted sum operation with respective states from the first quantizer and the second quantizer in accordance with a determination that the current state of dequantization corresponds to the second quantizer.

(A9) In some embodiments of A8, the weighted sum operation comprises a weighted sum of the two states of the first quantizer and at least one state of the second quantizer. For example, if the current state uses Q1 quantizer having odd multiples of step size as reconstructed values, then the adjusted transform value may be derived using Equation 12 above. In this example, the values of a, b, and c may be dependent on the codec operating bit depth.

(A10) In some embodiments of A8, the second weighted sum operation comprises a weighted sum of the two states of the second quantizer and at least one state of the first quantizer. For example, if the current state uses Q0 quantizer having even multiples of step size as reconstructed values, then the adjusted transform value may be derived using Equation 13 above. In this example, the values of a, b, and c may be dependent on the codec operating bit depth.

(A11) In some embodiments of any of A1-A10: (i) when the current state of dequantization corresponds to a first quantizer, the adjusted transform value is derived using a weighted sum operation; and (ii) when the current state of dequantization corresponds to a second quantizer, the adjusted transform value is set equal to the dequantized transform coefficient. For example, if the current state uses Q1 quantizer, no shifting is performed on the reconstructed transform coefficient values. As another example, if the current state uses Q0 quantizer, no shifting is performed on the reconstructed transform coefficient values. In some embodiments, the adjusted transform value is derived using the weighted sum operation in accordance with a determination that the current state of dequantization corresponds to the first quantizer. In some embodiments, the adjusted transform value is set equal to the dequantized transform coefficient in accordance with a determination that the current state of dequantization corresponds to the second quantizer.

(A12) In some embodiments of any of A1-A11, the offset value is dependent on a magnitude of the quantized transform coefficient level. For example, the offset value may be dependent on the magnitude of the quantization index. The amount of the offset may be (e.g., finetuned on a validation set and used as) a universal value for all videos.

(A13) In some embodiments of A12, the adjusted transform value is derived using a weighted sum operation of two or more quantization states, and wherein one or more weights for the weighted sum operation are dependent on the magnitude of the quantized transform coefficient level. For example, the adjusted transform value may be derived using Equation 16 or 17 above. In this example, the value of a and b depend on the magnitude of the quantization index.

(A14) In some embodiments of A13, the one or more weights are obtained from a look-up table according to the quantized transform coefficient level. For example, for quantization index falling in different ranges, different values for a and b can be selected. As an example, a look up table may be used to make the selection.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., method 600 and A1-A14 above). In yet another aspect, some embodiments include a non-transitory computer-readable storage medium storing one or more sets of instructions for execution by control circuitry of a computing system, the one or more sets of instructions including instructions for performing any of the methods described herein (e.g., method 600 and A1-A14 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, N refers to a variable number. Unless explicitly stated, different instances of N may refer to the same number (e.g., the same integer value, such as the number 2) or different numbers.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising a plurality of blocks and a plurality of quantized transform coefficients;
   deriving a dequantized transform coefficient for a first quantized transform coefficient of the plurality of quantized transform coefficients;
   obtaining an adjusted transform value by applying an offset value to the dequantized transform coefficient, the adjusted transform value based on a quantized transform coefficient level and a current state of dequantization; and
   reconstructing a first block using the adjusted transform value.

2. The method of claim 1, wherein, when the current state of dequantization corresponds to a first quantizer, the adjusted transform value is derived using a weighted sum operation for two states of the first quantizer.

3. The method of claim 2, wherein one or more weights for the weighted sum operation are based on a bit depth for the video bitstream.

4. The method of claim 2, wherein one or more weights for the weighted sum operation are signaled via high-level syntax in the video bitstream.

5. The method of claim 2, wherein one or more weights for the weighted sum operation are derived according to coded information.

6. The method of claim 5, wherein the coded information includes a quantization step size granularity.

7. The method of claim 2, wherein the weighted sum operation does not include a division operation.

8. The method of claim 2, wherein, when the current state of dequantization corresponds to a second quantizer, the adjusted transform value is derived using a second weighted sum operation with respective states from the first quantizer and the second quantizer.

9. The method of claim 8, wherein the weighted sum operation comprises a weighted sum of the two states of the first quantizer and at least one state of the second quantizer.

10. The method of claim 8, wherein the second weighted sum operation comprises a weighted sum of the two states of the second quantizer and at least one state of the first quantizer.

11. The method of claim 1, wherein:
    when the current state of dequantization corresponds to a first quantizer, the adjusted transform value is derived using a weighted sum operation; and
    when the current state of dequantization corresponds to a second quantizer, the adjusted transform value is set equal to the dequantized transform coefficient.

12. The method of claim 1, wherein the offset value is dependent on a magnitude of the quantized transform coefficient level.

13. The method of claim 12, wherein the adjusted transform value is derived using a weighted sum operation of two or more quantization states, and wherein one or more weights for the weighted sum operation are dependent on the magnitude of the quantized transform coefficient level.

14. The method of claim 13, wherein the one or more weights are obtained from a look-up table according to the quantized transform coefficient level.

15. A computing system, comprising:
control circuitry;
memory; and
one or more sets of instructions stored in the memory and configured for execution by the control circuitry, the one or more sets of instructions comprising instructions for:
receiving a video bitstream comprising a plurality of blocks and a plurality of quantized transform coefficients;
deriving a dequantized transform coefficient for a first quantized transform coefficient of the plurality of quantized transform coefficients;
obtaining an adjusted transform value by applying an offset value to the dequantized transform coefficient, the adjusted transform value based on a quantized transform coefficient level and a current state of dequantization; and
reconstructing a first block using the adjusted transform value.

16. The computing system of claim 15, wherein, when the current state of dequantization corresponds to a first quantizer, the adjusted transform value is derived using a weighted sum operation for two states of the first quantizer.

17. The computing system of claim 16, wherein, when the current state of dequantization corresponds to a second quantizer, the adjusted transform value is derived using a second weighted sum operation with respective states from the first quantizer and the second quantizer.

18. The computing system of claim 15, wherein:
when the current state of dequantization corresponds to a first quantizer, the adjusted transform value is derived using a weighted sum operation; and
when the current state of dequantization corresponds to a second quantizer, the adjusted transform value is set equal to the dequantized transform coefficient.

19. The computing system of claim 15, wherein the offset value is dependent on a magnitude of the quantized transform coefficient level.

20. A non-transitory computer-readable storage medium storing one or more sets of instructions configured for execution by a computing device having control circuitry and memory, the one or more sets of instructions comprising instructions for:
receiving a video bitstream comprising a plurality of blocks and a plurality of quantized transform coefficients;
deriving a dequantized transform coefficient for a first quantized transform coefficient of the plurality of quantized transform coefficients;
obtaining an adjusted transform value by applying an offset value to the dequantized transform coefficient, the adjusted transform value based on a quantized transform coefficient level and a current state of dequantization; and
reconstructing a first block using the adjusted transform value.

* * * * *